Feb. 12, 1963    T. FLINT ETAL    3,077,348
BOWLING PIN SPOTTING MECHANISM
Original Filed Nov. 12, 1948    9 Sheets-Sheet 1

FIG.1

INVENTORS
THOMAS FLINT
JOHN M. FLUKE
BY
ATTORNEY

Feb. 12, 1963  T. FLINT ETAL  3,077,348
BOWLING PIN SPOTTING MECHANISM
Original Filed Nov. 12, 1948  9 Sheets-Sheet 7

INVENTOR
THOMAS FLINT
JOHN M. FLUKE
BY
ATTORNEY

Feb. 12, 1963 T. FLINT ETAL 3,077,348
BOWLING PIN SPOTTING MECHANISM
Original Filed Nov. 12, 1948 9 Sheets-Sheet 9

INVENTOR
THOMAS FLINT
JOHN M. FLUKE
BY
ATTORNEY

United States Patent Office 3,077,348
Patented Feb. 12, 1963

3,077,348
BOWLING PIN SPOTTING MECHANISM
Thomas Flint, Concord, Mass., and John M. Fluke, Seattle, Wash., assignors to American Machine & Foundry Company, a corporation of New Jersey
Application May 3, 1954, Ser. No. 427,166, now Patent No. 2,977,121, dated Mar. 28, 1961, which is a division of application Ser. No. 59,706, Nov. 12, 1948, now Patent No. 2,736,554, dated Feb. 28, 1956. Divided and this application Feb. 19, 1960, Ser. No. 15,010
7 Claims. (Cl. 273—43)

This invention relates to bowling pin spotting machines and more particularly to improvements in mechanism forming a part thereof for spotting a set of bowling pins in a predetermined playing arrangement or formation on the playing bed of a bowling alley.

This invention relates generally to automatic bowling pin spotting machines, such for example as the types shown in Rundell Patents 2,388,707 and 2,388,709 issued November 13, 1945 in which bowling pins fall or are delivered into the pit of a bowling alley, and are lifted therefrom and conveyed to mechanisms which distribute the pins and transfer them into devices which at the proper time spot them in playing positions on the bed of a bowling alley. While reference is made to machines such as shown in the above referred to Rundell patents, it is to be understood that the structure of the present invention is not limited to this type of machine, but can be readily adapted for use in other types of automatic bowling pin spotting machines if desired.

This application constitutes a division of our co-pending application Ser. No. 427,166, filed May 3, 1954, now Patent No. 2,977,121, which is a division of our application Ser. No. 59,706, now Patent 2,736,554.

The invention also provides spotting mechanism assembled on a table adapted to be moved vertically to and from a pin receiving position adjacent the distributing mechanism, and the pin spotting position relative to a bowling alley. The spotting mechanism is so arranged on the table that it operates from one side thereof and thereby co-operatively with an electro-mechanical latching mechanism makes it possible to use a simple vertical up and down movement in order to effect the required operation of spotting bowling pins on the pin supporting bed of a bowling alley.

The invention further consists in the provision of pin spotting mechanism which is constructed to cause the butt ends of bowling pins to project slightly below the bottom of the table when the table nears the playing bed of the bowling alley during the spotting period. The distance a pin projects may vary in accordance with variations in pin diameters and lengths of pins due to the fact that all pins are supported by partly open doors within which the pins are supported and guided and come to rest thereon in accordance with their diameters for proper delivery to the bowling alley. This construction allows the machine to handle a wide range of pin sizes, which may vary lengthwise and transversely. In this manner the machine is equally effective in spotting first quality or "league" bowling pins, or worn pins, such as generally used in "open play," which may have been turned down and shortened or repaired in order to prolong their life.

The invention further consists in the provision of a bowling pin spotting and respotting table which is so designed that it can be located very close to the alley bed in order that pins to be spotted are held under positive control of the spotting members until they practically touch the table. In this way applicants insure maximum accuracy in spotting with a minimum of noise, as compared with prior bowling pin spotting machines in which pins are dropped a considerable distance after their release from their supporting means in the spotting table.

According to applicants' construction, the release of pins to be spotted and respotted is effected easily and relatively slowly because of the provision of a driving crank arm which swings crosswise as the table is lowered towards the alley imparting substantially a simple harmonic motion to the table, thus reducing the lowering speed of the vertical travel of the table and insuring that pins to be spotted or respotted will be placed gently upon the alley.

It is a further object of the invention to provide an improved pin spotting mechanism having novel means for supporting pins to be spotted and for guiding them into accurate spotting arrangement on the playing bed of a bowling alley.

With these and other objects not specifically mentioned in view, the invention consists of certain combinations and constructions which will be hereinafter fully described, and then set forth in the claims hereunto appended.

In the accompanying drawings which form a part of this specification, and in which like characters of reference indicate the same or like parts.

The present invention is directed to the pin spotting mechanism so that, for other details of the bowling pin spotting machine not disclosed herein, reference is to be had to the aforementioned Patent 2,736,554.

Figure 1:
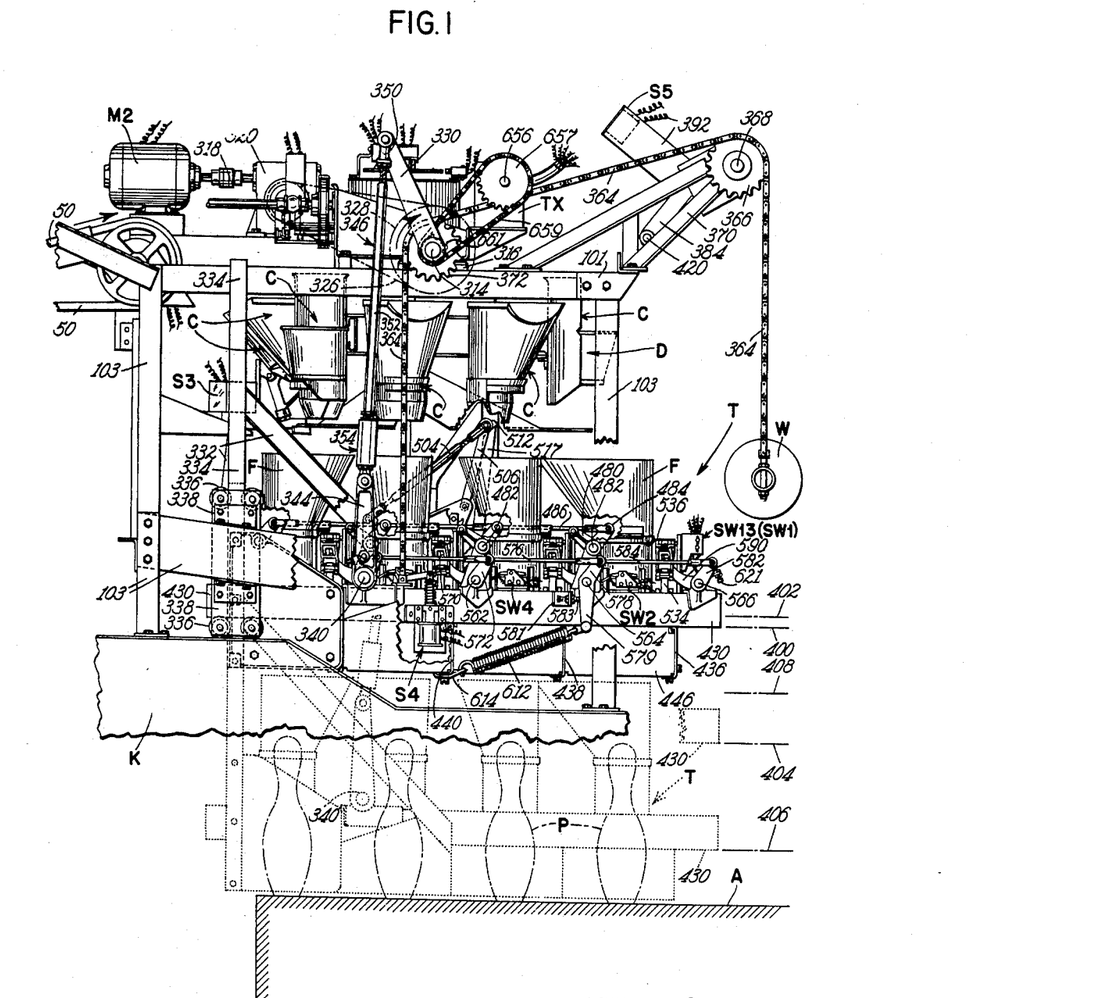
FIGURE 1 is a side elevation of the bowling pin setting machine showing the pin distributor in conjunction with the pin spotter and respotter table.

Referring to FIGURE 1, there is shown an endless driven conveyor 50 which delivers bowling pins butt-end first and in succession to a distributor D having a plurality of cups C arranged to deliver the bowling pins to the funnels F of a spotting-respotting table T. The number of cups C and of funnels F corresponds to the number of pins in play which, in the illustrated embodiment, is ten.

*Pin Spotting and Respotting Mechanism*

Referring to FIGURE 1, it will be seen that the pin supporting devices F, into which pins are delivered from distributor D, are mounted on and from a part of pin spotting and respotting table T located beneath distributor D. Table T is mounted for movement upwardly and downwardly between a pin receiving position beneath distributor D, and pin spotting, and respotting positions relative to alley A. Table T is supported by the opposite side frame members 103 of the machine which are attached to kickbacks K. Table T hangs from a main cross shaft 314 journaled in suitable bearings 316 secured to the top of side frame 103.

Figures 7, 7A:
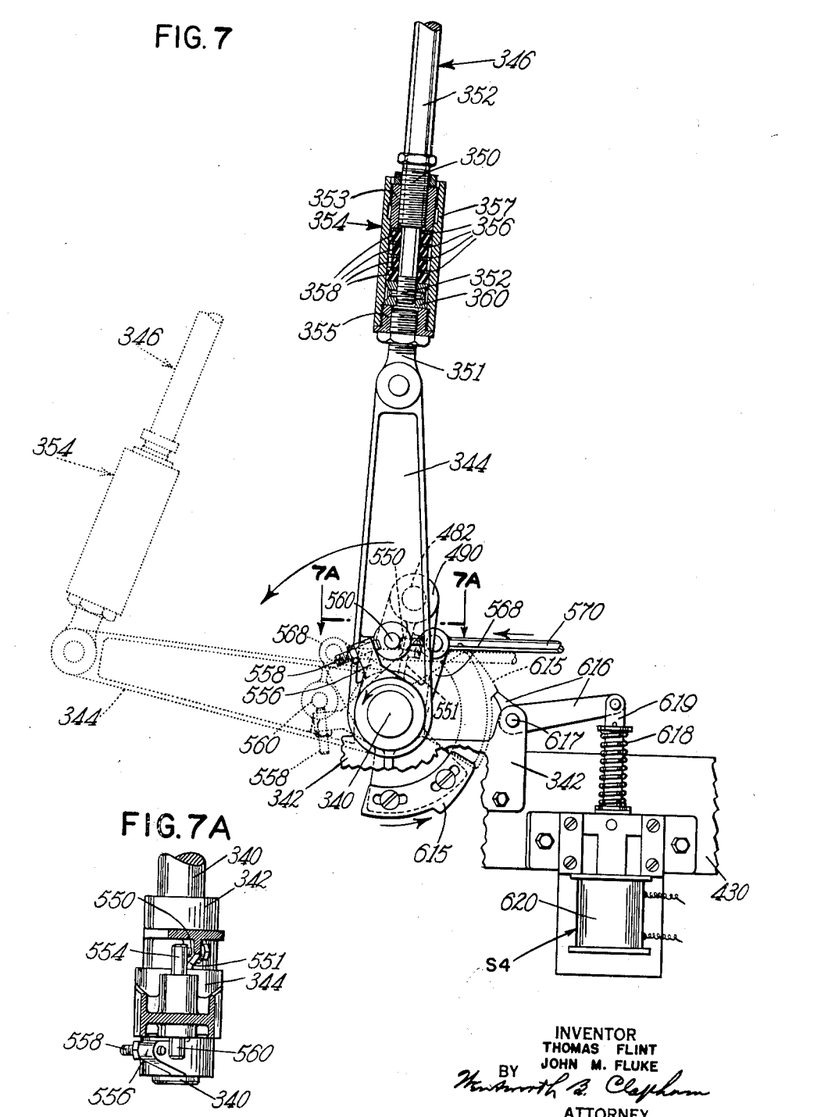
FIGURE 7 is a detailed side elevation of the pin gripper control mechanism.
FIGURE 7A is a sectional plan view on line 7A—7A of FIGURE 7.
Figures 8, 9:
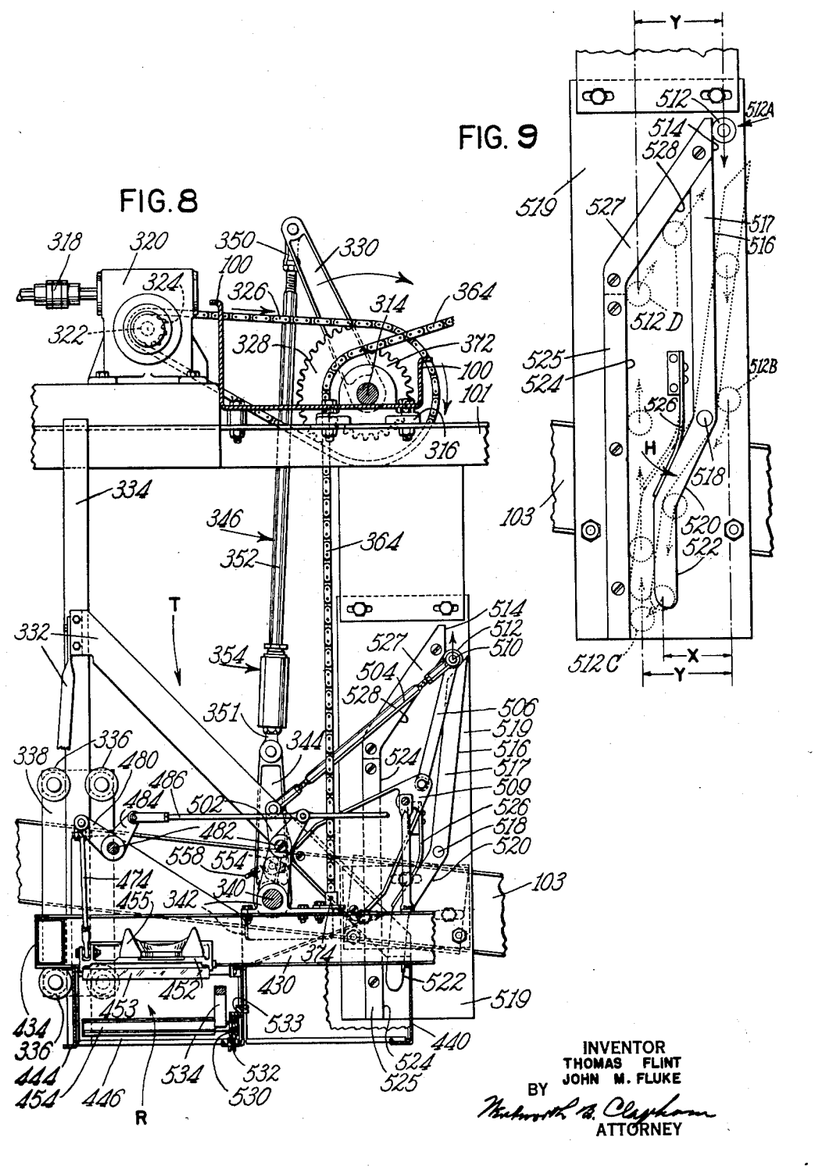
FIGURE 8 is a detailed side elevation of the pin spotting mechanism for placing new sets of pins on the alley.
FIGURE 9 is an enlarged detailed side elevation of the cam control mechanism for the same.

The mechanism for supporting and moving table T to and from the pin supporting portion or bed of alley A, is clearly shown in FIGURES 1, 7 and 8. Suitably mounted on one side of frame member 103 is a motor M2 which is operated at the proper time during the operation of the machine by controls described hereinafter which effect the up and down motion of table T in order to spot and respot pins on alley A. The shaft of motor M2 is connected, as by means of a flexible coupling 318, to a suitable gear reduction unit 320 provided with an output shaft 322 on which is keyed sprocket 324. A chain 326 engaging sprocket 324 also engages a larger sprocket 328 keyed to main cross shaft 314 on the opposite ends of which are secured aligned crank arms 330. In this manner and by means of suitable speed reducing ratios, the desired number of revolutions per minute of shaft 314 is obtained during the periods when motor M2 is energized.

Figure 2:
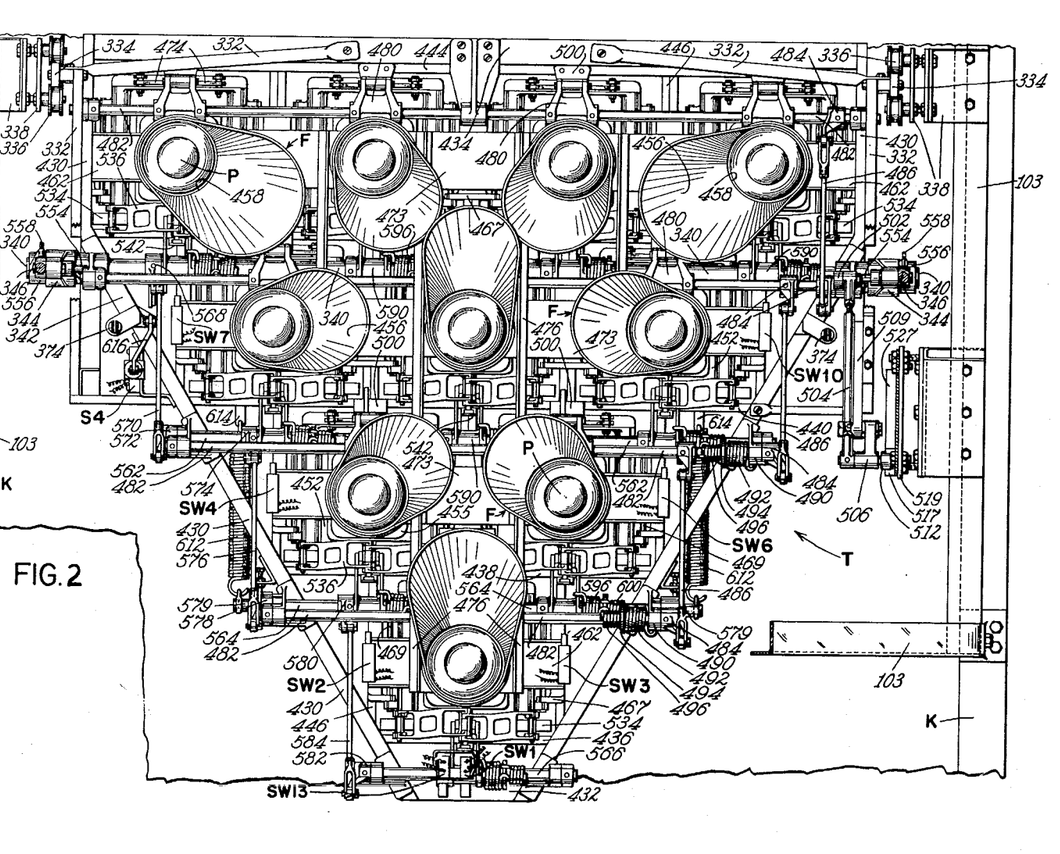
FIGURE 2 is a plan view of the pin spotting-respotting table.

As shown in FIGURE 2, for example, table T preferably is in the form of a generally triangular framework which supports the spotting and respotting devices, and operating mechanisms therefor. Attached to opposite rear corners of table T are upwardly extending members 332 forming a support for a vertical guide plate 334. Plates 334 engage vertically spaced sets of guide rollers 336 mounted in stationary brackets 338 secured to side frames 103, whereby table T is guided in a substantially vertical path at all times during its upward and downward movement relative to alley A.

A transverse shaft 340 is mounted in bearings 342 mounted on side member 434 of frame structure of table T. At its extremities, shaft 340 supports crank arms 344 mounted for free rotation thereon. Connecting rods or links designated generally 346 connect the free ends of crank arms 330 and 344. As shown in FIGURES 1, 7 and 8, each link consists of an intermediate rod section 352, an adjustable threaded sleeve 350a, a connecting member 351, and a shock absorber 354. Sleeve 350, through which a reduced portion of rod section 352 projects, is threadably connected to a bushing 353 threadably secured to shock absorber housing 357. Member 351 is pivotally connected to crank arm 344, and also threadably secured to a threaded plug 355 secured in the lower end of housing 357 of shock absorber 354. Enclosed within housing 357 and encircling the reduced portion of rod section 352, are alternating laminations of washers 356, such as steel or other suitable metal or material, and resilient elements 358, preferably rubber, or other suitable material, which are compressed as a unit by a collar 360 attached to the end of the reduced portion of section 352 in order to cushion shocks and loads imposed upon crank arms 330 and 344, and for the purpose of imparting a smoother upward motion to the table during its movement to and from the pin supporting bed of a bowling alley.

The foregoing structure is such that when an excessive load is placed on the table raising and lowering mechanism, as when upward movement of table T is initiated, collar 360 compresses the unit comprising washers 356 and resilient elements 358 to a greater extent than under normal operating conditions, and thereby momentarily lengthens rod 346; so also when table T is lowered after the first ball of a frame is rolled.

The upward and downward movement of table T relative to alley A is effected by the movement of crank arms 330 and connecting rods 346. As crank arms 330 travel in a clockwise direction, as viewed in FIGURE 1, and the pivotal connections between arms 330 and rods 346 move past dead center, crank arms 344 move in a counter clockwise direction. In this manner, table T, which is guided vertically by tracks 334 and rollers 336, is given a substantially straight-line movement to and from alley A. In order to reduce the power required for moving table T upwardly relative to the pin supporting bed of alley A, table T is counterbalanced by weights or a single weight W. As shown in FIGURE 1, the counterweight is located at the front of the machine, although if desired, it could be located at any other suitable place. Weight W is mounted on the ends of spaced chains 364 which extend upwardly from the weight over spaced sprockets 366 secured to opposite ends of a shaft 363 journaled in suitable bearings in forwardly and upwardly inclined spaced brackets 370 mounted on the frame structure of the machine. Chains 364 pass thence rearwardly over sprockets 372 loosely mounted at the opposite ends of shaft 314 and extend downwardly to suitable attaching elements which secure chains 364 to opposite sides of table T at 374. The weight of the table preferably is slightly in excess of counterweight W, so that table T always attempts to move downwardly against the action of weight W.

The normal at rest position of table T is designated position 400, see FIGURE 1. In a typical bowling cycle where two balls are employed for each frame, after the first ball has been rolled, table T moves from position 400 upwardly to position 402, thence downwardly to position 404 which is termed the respotting position, where standing pins are detected and gripped for lifting and respotting in on or off-spot positions as required by the individual pin positions. Table T then moves upwardly carrying any gripped pins to be respotted to position 400 while a suitable sweep (not shown) operates, removes fallen pins from the alley and deposits them in the alley pit before table T, moving continuously, moves to respotting position 404, where pins previously picked up, are deposited in their respective previous on or off-spot positions on the alley and released by grippers 454. Table T then moves upwardly to position 400 where it remains at rest while the second ball of the same frame is rolled. The second ball having been rolled, the operation of the machine is started and table T moves upwardly to position 402, thence downwardly to position 404 where the presence or absence of any pins remaining standing is detected. However, in this case, any standing pins are not picked up. The table then moves upwardly while the sweep again traverses the pin supporting bed of the alley and removes therefrom all fallen and standing pins. Table T, moving to position 402, receives a set of pins carried by the distributor cups so that when table T descends to its lowest or spotting position 406, see FIGURE 1, a new set of pins, carried by the table in funnels F, is released and deposited in proper on-spot triangular arrangement on the bed of the alley awaiting rolling of the next ball. Table T continues to move until it arrives at position 400 where it comes to rest.

A guard (not shown) may be provided to prevent damage to the table or parts thereof by an inadvertently or carelessly rolled ball during spotting and respotting operations, and also during the operation of the sweep. The guard is raised above the alley to inoperative position relative to alley A whenever the alley is ready for bowling.

If all pins are knocked down or a strike occurs when the first ball of a frame is rolled, table T moves as before, first up to position 402 and then down to pin detecting and respotting position 404 and returns as hereinabove explained. The sweep passes rearwardly over the pin supporting bed of the alley, removing therefrom all fallen pins, and returns to inoperative position. Table T continues to move upwardly and at pin receiving position 402 a new set of pins in distributor D is discharged into the pin spotting devices or funnels F, after which table T moves all the way down to pin spotting position 406 and spots a new set of pins on the alley. Intelligence for accomplishing this is received by the electrical control system owing to the fact that the table has not detected the presence of any standing pins at position 404.

It will be seen that some of the intervening movements of the table, previously described, which occur in the absence of a strike on the first ball, and some of the movements in the second cycle of operations of table T are eliminated following a strike play.

Counterweight chains 364 will obviously have the same reciprocating travel as that of table T in a vertical direction. Chains 364 in passing over sprockets 366 cause the rotation of shaft 368 which is directly synchronized with the vertical movement of table T. For the purpose of indicating the presence or absence of pins after each ball is rolled, for gripping any standing pins for lifting and respotting after the first ball of a frame is rolled and for respotting such pins in their respective on or off-spot positions, it is necessary that the table be maintained in position 404 for a period sufficient to carry out these desired operations. A preferred mechanism for accomplishing this result consists of a latch (not shown) attached to one of the sprockets 366. As indicated, the latch is so positioned, that when table T is located at detecting-respotting position 404, it engages with the plunger of a shock absorber 384 pivotally mounted on the forward portion of main frame 103. The armature of a solenoid S5, which is mounted on bracket 392, is operatively connected to pivot shock absorber 384 in response to energization of solenoid S5, the energization of the solenoid being effective to move the plungers of the shock absorber out of engagement with the latch to permit further downward movement of table T from position 404.

*Spotter and Respotter Table*

The frame of table T consists of an upper frame and a lower frame interconnected therewith to form a single unit. The upper frame assembly is essentially triangular in shape and is formed of channel section side members 430 connected at their front ends as viewed at the bottom of FIGURE 2, by a transverse member 432. At their rear ends, channel section side members 430, see FIGURE 2, are connected by a transverse member 434, which, in the illustrated embodiment, is a rectangular tubular section.

Figure 4:
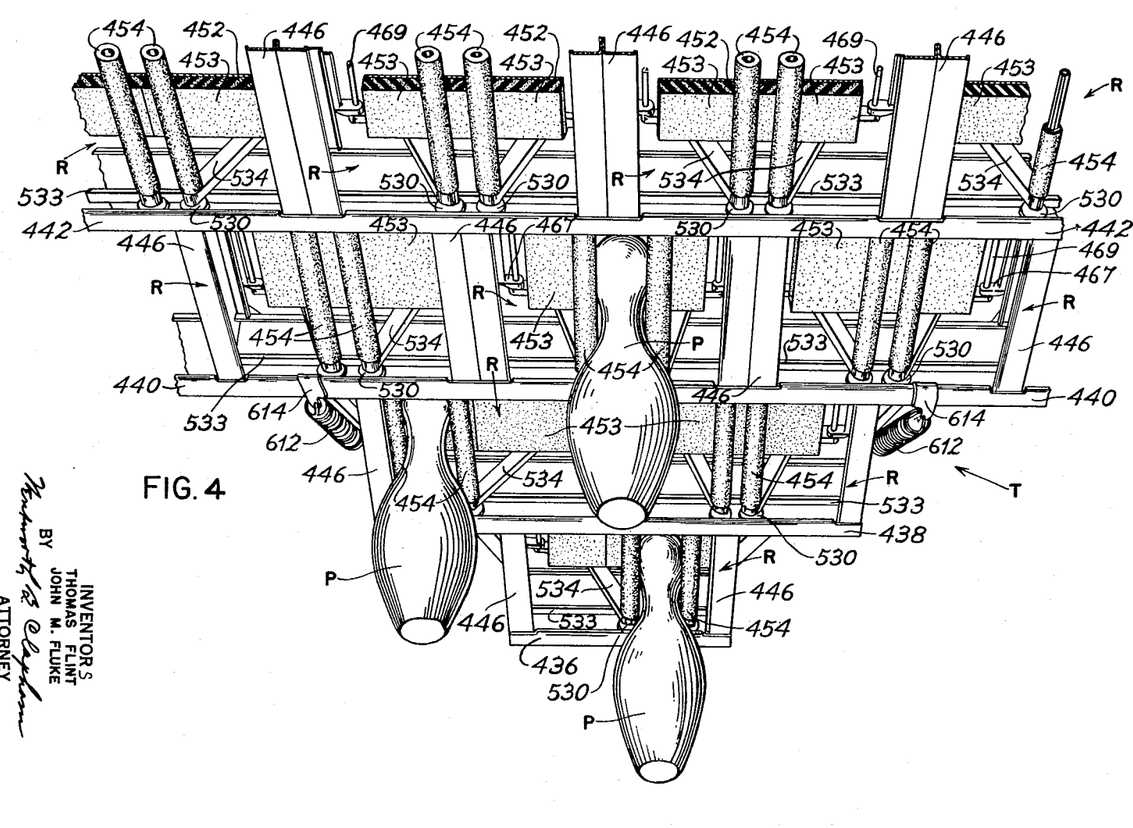
FIGURE 4 is an isometric bottom view of the table illustrating the respotting or pin gripper mechanisms during pin gripping action.

The lower frame assembly consists of longitudinally spaced transverse channel sections 436, 438, 440, 442 and 444, connected by laterally spaced longitudinal channels 446 to form an assembly which makes up a series of ten substantially rectangular cells R, see FIGURE 4. Each cell R has its central vertical axis disposed in substantially vertical alignment with the axis of one of a set of ten pins P supported in spotter funnels F, the latter being arranged in a pattern corresponding to the playing positions the pins occupy on the alley.

The pin spotting or upper portion of the table includes ten triangularly arranged pin spotting devices designated generally 451. Each of these devices includes a pin receiving and holding member such as a funnel F located at the top of table T and projecting upwardly therefrom, FIGURES 1, 2, 5 and 6, into which pins are delivered at the proper time from the distributor cups, and within which they are supported in substantially centered rest position upon movable supports, such as trap doors 452. A pair or set of trap doors 452 is mounted above each of the respotting cells R directly beneath the lower portion of each funnel F as indicated in FIGURE 6. At the proper time in the cycle of operations of the machine, each of the ten sets of doors 452 is opened simultaneously and moved downwardly away from the pin which has been supported in each spotting device 451 so that all pins contained in the several spotting devices 451 are released substantially simultaneously and delivered to their desired spotted positions on the alley. Each set of doors 452 in addition to performing the function of supporting pins in spotting devices 451 for placement on the alley, is also designed to guide each pin into proper spotted position on the alley.

Mounted in the lower portion of table T within each cell R is a pair of opposed gripping bars or devices 454, FIGURES 4 and 6, which bars or devices are located beneath and in symmetrical arrangement with respect to each set of doors 452. Bars 454 may be formed of wood, metal or plastic or combinations thereof. gripping bars or devices 454 are movable toward and from each other for gripping and holding pins to be lifted from the alley during the removal of deadwood and unwanted pins and for respotting and releasing the pins held thereby in the respotted on or off-spot positions each pin occupied ready for the rolling of the next ball of the same frame. Each gripping bar or device 454 preferably is provided with a covering, generally a resilient material, such as rubber, which insures a firm grip and also tends to prevent damage to the neck portions of pins being gripped, lifted and respotted.

Figure 5:
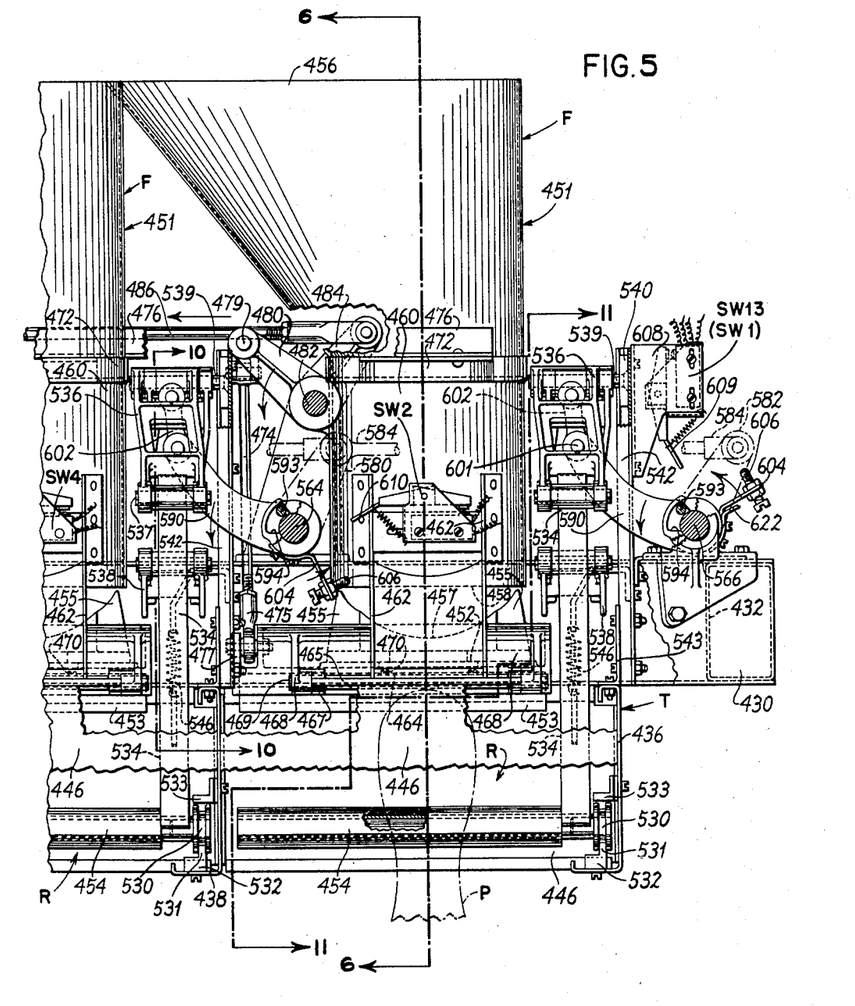
FIGURE 5 is a side elevation, partly in section, of a single spotting-respotting unit of the table.
Figure 6:
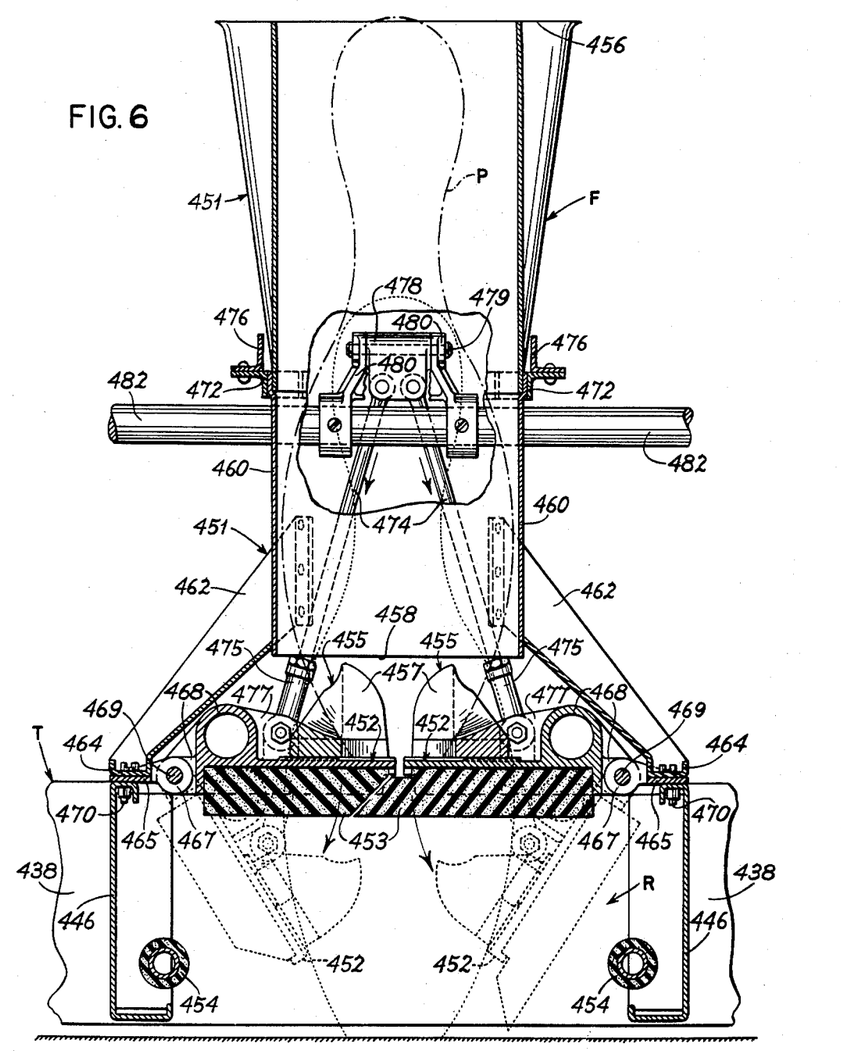
FIGURE 6 is a sectional end elevation of the same, taken on line 6—6 of FIGURE 5.

Referring to FIGURES 2, 5 and 6, each of the funnels F disclosed is formed with an inverted generally truncated conical or flaring shape with a relatively larger open top portion 456, and a tubular lower portion 460 which can be formed integrally therewith or attached thereto. Lower portion 460 preferably is cylindrical and therefore has a circular discharge bottom opening 458. The diameter of portion 460 preferably is only slightly greater than the maximum diameter of a bowling pin. The top portions 456 of funnels F are flared laterally and are so positioned on table T with respect to distributor D that they register with the discharge openings of cups C thereon. The bottom openings 458 of funnels F, which are all positioned concentrically with the centers of the pin spots on a bowling alley, are disposed in a plane a short distance above the plane of the top faces of longitudinal members 446.

As shown in FIGURES 5 and 6, the opposite sides of each member 460 are secured to the upper ends of oppositely directed supporting brackets 462. The lower ends 464 of brackets 462 are attached to the stationary parts 465 of hinges 467, which in turn are secured, as by bolts 470, to the top faces of frame members 446. Stiffening members 473 and 476 are attached to brackets 472 secured to cylindrical portions 460 of funnels F.

Figure 3:
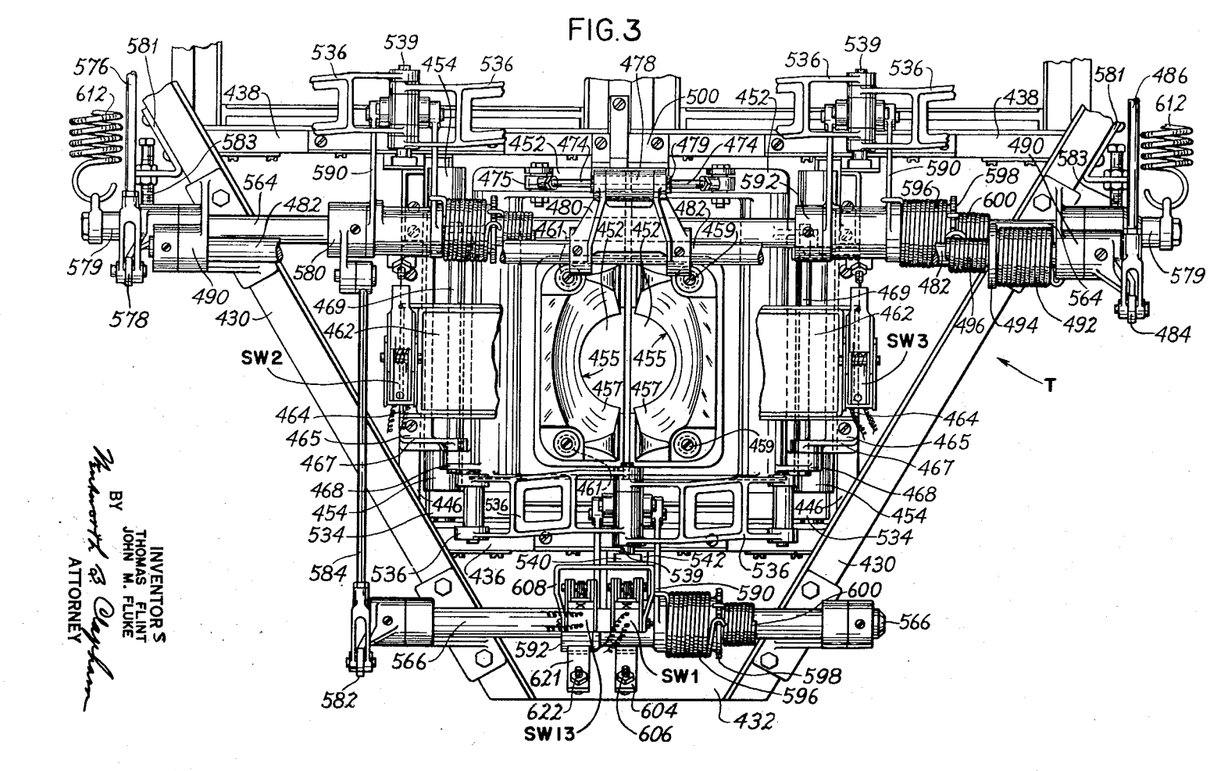
FIGURE 3 is a plan view of a single cell or spotting-respotting unit.

Referring to FIGURES 3, 5 and 6, each of the doors 452 consists essentially of a rectangular support, attached to or formed integrally with a hinge member 468 pivotally mounted on hinge pin 469. Doors 452 perform the dual function of supporting and guiding pins to be spotted, and also holding pins to be lifted and respotted in their respective on or off-spot positions so that such pins can be gripped properly for lifting and respotting. For this reason, the underside of each door preferably is provided with an undersurface which, when table T is lowered to respotting position, engages the head ends of any standing pins and holds them firmly against lateral movement on the alley. A resilient material, such as sponge rubber pad 453, has been found to be satisfactory for this purpose, see FIGURES 4, 6 and 11.

The upper surface of each door 452 is provided with a pin guide 455. The guide can be formed integrally with door 452, or as illustrated, can be attached to the upper surface thereof. Twenty guides are provided, one for each door, or two opposed guides for each set of doors 452. Since these guides are identical, only one is described in detail.

Each guide 455 is provided with an interior curved section 457 having an upwardly curved portion which generally conforms with the curve or taper of the butt end portion of a pin. Its shape is such that when doors 452 are closed and a pin to be spotted is resting thereon, the butt end of the pin is centered by the two opposed guides 455 relative to the spotted position it will occupy on the alley. When doors 452 are opened, the butt end of the pin is guided continuously by opposed curved portions 457 of guides 455 as the pin passes downwardly therebetween onto the alley. The same operation occurs in each of the ten spotter units 451. Each guide is adjustably mounted on its respective supporting door 452. In this manner, guide 455 of each unit 451 can be adjusted to and from or laterally relative to each other and secured by screws 459 passing through enlarged holes 461 in guides 455, FIGURE 3, in proper operative pin supporting and guiding relationship for exact spotting on the alley.

Each door 452 is actuated by a link 474, preferably having a ball joint end fitting 475, of any suitable conventional type, which is pivotally connected to an upstanding flange 477 on hinge portion 468. For each pair of doors, two of the links 474 have their upper ends attached to a pivot block 478 for synchronizing the action of the two doors with respect to each other. Each block 478 is mounted on a pivot 479 supported in the free ends of two spaced crank arms 480 which are attached to a rocker shaft 482. As seen in the drawings, the cell R, which corresponds to the position of pin #1, may be considered typical of the ten cells R of table T. The movement of doors 452 is effected by rotation of one of the shafts 482. Referring to FIGURE 2, rear shaft 482 operates four sets of doors 452 by virtue of having four sets of crank arms 480 attached to it. To the right hand extremity of each of shafts 482 is fixed a crank arm 484. Since it is desirable to operate all of doors 452 simultaneously and to the same degree, all of the rock shafts 482 are similarly interconnected so as to be rotated to the same extent.

The first and fourth shaft 482, as viewed from the bottom of FIGURE 2, are each provided with a single crank arm 484. These arms are of the same length and are fixed to the shafts to extend in the same angular relation thereto. The two crank arms 484 on the driven rock shaft 482 (the third shaft as viewed from the bottom of FIGURE 2) are operatively connected respectively to the ends of the crank arms 484 on the two adjacent shafts 482 by links 486. In turn, the second shaft from the bottom of FIGURE 2 is operatively connected to the fourth shaft 482 by a link 486 pivotally attached to crank arms 484 on those shafts. Thus, upon oscillation of the driven rock shaft 482 to a predetermined extent, all of the other shafts 482 will be turned to a similar extent and in the same direction to thereby rock the crank arms 480 on the shafts and simultaneously open all pairs of doors 452 through their respective blocks 478 and links 474. Shafts 482 are journalled at their opposite ends in bearing brackets 490 attached to the top faces of the side frame members 430.

In FIGURES 2, 3, 5 and 6, the mechanism, including rock shafts 482 and links 486 and associated parts, is shown in a position in which the doors 452 are in closed position. That is to say, the mechanism thus far described constitutes synchronizing means for effecting like action on the doors in accordance with the actuation in the proper direction of the driven rock shaft 482.

When the mechanism for operating shafts 482 is actuated, the driven rock shaft 482 is turned in a direction which results in releasing or freeing, under mechanical control, the other rock shafts 482 so that they may be rotated in a direction to effect opening of the doors 452, under positive spring action. In the drawings, FIGURES 2 and 3, there are shown such spring devices arranged on one end of the first and second of the shafts 482. It should be understood, however, that each of the four shafts 482 can also be provided with one of such devices on an end thereof. These devices are constructed and arranged to operate as follows:

A spring 492 of conventional torsion type has one end fixed to a bearing member 490 in which an end of shaft 482 is journalled. The opposite end of spring 492 is attached to sleeve 494 loose on shaft 482. A smaller locking or clutch spring 496 also surrounding shaft 482 and having a close tolerance fit thereto has one of its ends attached to sleeve 494. By this combination of driving spring 492, attaching sleeve 494 and locking spring 496, it is possible to easily wind up spring 492 to any desired torque value, and the spring clutch locking action of spring 496 will then positively transmit that torque into shaft 482 to transmit motion for opening doors 452.

It is desirable to regulate or control the closed position of the pairs of doors 452 in order to insure that the bottom faces of the pin head engaging surfaces 453 all lie in substantially the same horizontal plane to insure substantially uniform contact with the heads of standing pins. This result may be obtained by means of a series of lugs or members 500 attached to the transverse members 438–444 in position to extend inwardly a short distance over the edge of each cell. The bottom faces of members 500 lie in the same plane. Each member 500 projects inwardly centrally of a cell so that portions of doors 452 of each pair, when moved to closed position, will abut against and be arrested in proper position by said extensions against further upward movement.

The main actuating rock shaft 482 in the illustrated embodiment is the third from the bottom, as viewed in FIGURE 2. Attached to one end of this shaft, which actuates the three other shafts 482, is a crank arm 502, see FIGURE 8. The free end of arm 502 is connected to one end of an adjustable link 504, the other end of which link is connected by a pivot pin 510 to one end of a link 506. The other end of link 506 is pivotally attached to bracket 509 mounted on the frame of table T, as shown in FIGURE 8, thus forming the elements of a typical four-bar linkage. A cam roller 512 mounted on pivot pin 510 engages the cam faces of cams shown in FIGURE 9, to be described more fully hereinafter. The spring loading of driven shaft 482, as previously described, tends to move the four-bar linkage in the general direction of arrow T shown in FIGURE 8.

Referring now to FIGURE 9, when table T is in its full up position 402, roller 512 will be located at point 512A and yieldingly forced against cam face 514 by a suitable spring (not shown). As the table moves downwardly after the rolling of the first ball of a frame and when there are pins standing on the alley to be lifted and respotted, cam roller 512 rolls from cam face 514 onto an upright cam face 516 to position 512B. Cam face 516 is formed on a cam bar 517 pivoted at 518 on a plate 519 fixed to the machine frame. Table T in returning to its full up position, causes roller 512 to travel upwardly along cam face 516 and come to rest again at point 512A on cam face 514. In traversing this path, no horizontal motion is transmitted to cam roller 512, hence no motion is transmitted through the four-bar linkage to the pairs of doors 452, and they remain closed.

When a set of pins in spotter devices 451 is to be placed on the alley, table T moves downwardly and roller 512 moves from cam face 514, downwardly along cam face 516 past pivot point 518 continuing downwardly and to the left along a sloping cam face 520 on bar 517 and thence to vertical cam face 522 on that bar. As roller 512 moves below pivot 518, bar 517 swings clockwise on that pivot, as viewed in FIGURE 21, against the action of spring 526, until it bears against vertical cam face 524 on a fixed bar 525.

Thus cam roller 512 has moved in a horizontal direction a distance X (FIGURE 9), which motion is transmitted through the four-bar linkage previously described, thence through the door operating mechanism. Doors 452 are opened a predetermined amount consistent with the movement X of roller 512. In this position of roller 512, doors 452 are almost completely opened, but not enough to allow the pin to drop through the door opening. As roller 512 progresses downwardly to the end of cam face 522, it rolls off the lower end of bar 517 and abruptly engages against cam face 524 at position 512C. This last action of roller 512 in moving quickly from cam face 522 to cam face 524, positively and quickly opens doors 452 to their full extent and effects a quick release and deposit of a set of pins upon the alley. It is to be noted that each set of doors 452 opens sufficiently to clear a spotted pin entirely as table T moves upwardly.

Spring 526, as shown in FIGURE 9, urges pivoted cam bar 517 in the direction indicated by arrow H. As roller 512 passes downwardly along cam faces 520 and 522, spring pressure, derived from springs 492 and 496 on shafts 482, is sufficient to overcome the action of spring 526 and shift bar 517 as stated. Upon upward movement of table T after a set of pins has been spotted, since cam roller 512 has moved out of contact with the lower end of cam bar 517, spring 526 returns the bar to its normal position, which is determined by the engagement of the upper end of bar 517 with a fixed inclined bar 527, the lower end of which aligns with the upper end of cam bar 525.

During the movement of table T upwardly after having deposited a set of pins on the alley, roller 512 rolls upwardly between bars 517 and 525 and along cam face 524 to position 512D. It can be seen that in this vertical travel of roller 512, no displacement of roller 512 in the horizontal direction takes place. With cam roller 512 at position 512D, the bottom edges of the now open doors 452 have ascended to a position above the tops and clear of the pins standing on the alley. As the table continues upward roller 512 passes along inclined cam face 528 of bar 527 and in so doing, contacts the inner face of the upper arm of the pivoted bar 517 and moves that bar on its pivot clockwise, as viewed in FIGURE 9, to allow passage to roller 512 out between bars 517 and 527 and back to its original position at 512A, resting against outer cam face 514.

Movement of cam roller 512 from position 512D to 512A, causes roller 512 to be displaced horizontally a distance Y, as indicated, thus transmitting motion through the four-bar linkage and the previously described door-operating mechanism, rewinding springs 492 to effect closing of the doors 452 against their stops 500. In FIGURE 9, the position 512A, 512B, and 512C represent the position of the roller 512 corresponding to positions of the center of shaft 340 as represented at 402, 404, and 406 on FIGURE 1. The position of roller 512 when the center of shaft 340 is at a position as represented at 400, is directly below roller position 512A.

*Pin Respotting Mechanism*

Each of the ten cells R is provided with means, operative at the proper time in the bowling cycle, for gripping and holding pins to be lifted and replaced in their on and/or off-spot positions pending rolling of the next ball of the same frame. This gripping means includes the opposed pairs of substantially parallel arms of bars 454. Since each pair or set of bars 454 is identical in construction and operation, it is deemed sufficient to describe but one in detail.

The opposed pairs of gripper bars 454, as indicated in FIG. 5, extend longitudinally relative to a bowling alley, although if desired, they could extend transversely or at an angle to the longitudinal axis of the frame of table T. In their full open or inoperative positions, bars 454 are located adjacent opposite sides of cells R. One end of each gripper bar 454 is provided with a freely rotatable roller 530, FIGS. 5 and 11, located beneath a guide bar 533 attached to a channel section, as for example, 436. Roller 530 runs on a flange 531 formed on a transverse horizontal track bar 532 attached to a transverse member of a cell R.

Figure 10:
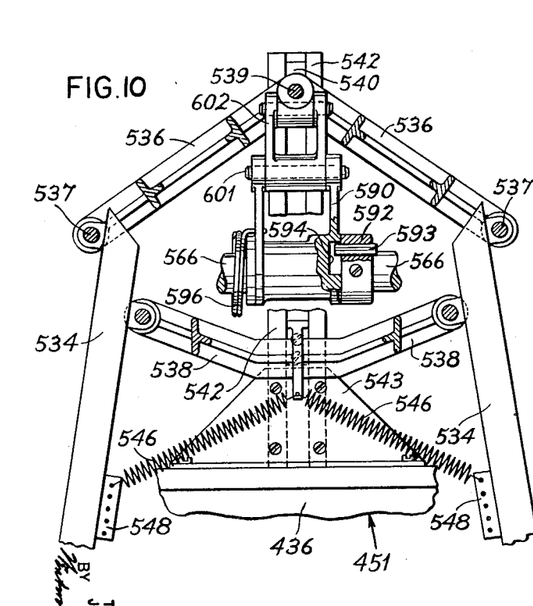
FIGURE 10 is a partial end elevation of the pin gripper linkage construction.
Figure 11:
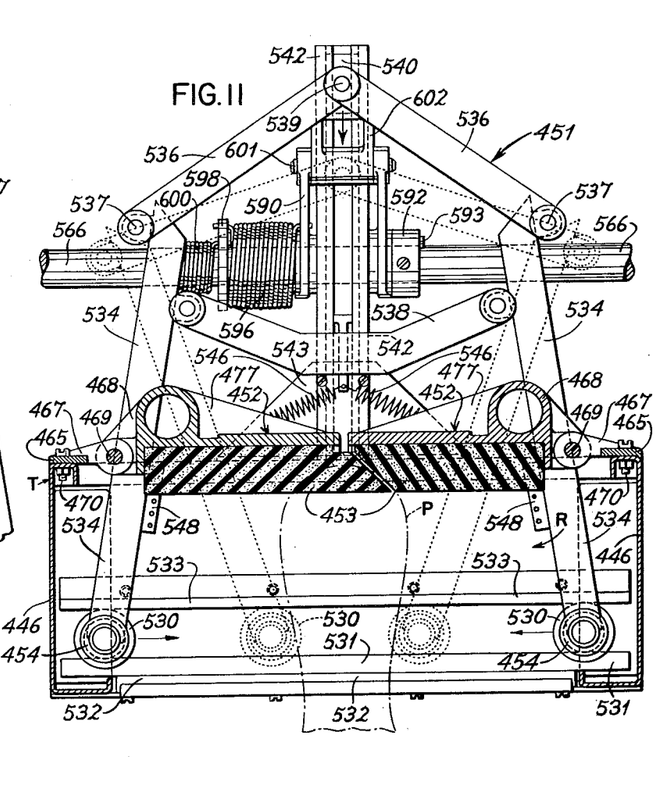
FIGURE 11 is a detailed sectional end elevation of a single unit of pin grippers taken on line 11—11 of FIGURE 5.

In the illustrated embodiment, see FIGURES 10 and 11, actuation of each set of gripper arms 454 is effected by a self-centering, five-bar linkage unit consisting of a pair of downwardly extending links 534, a pair of links 536 and a cross link 538. The common pivot 539 between links 536 is attached to a slide 540, slidably supported on and guided by a vertical track bar 542 attached to the upper flange of one of transverse beams 436–444 by means of a clip 543. The outer ends of links 536 are pivotally attached at 537 to the upper ends of links 534, which in turn are pivotally connected between their ends to link 538.

Tension prings 546 are attached to the lower end of track bar 542 and to clips 548 on the pendant links 534. The purpose of springs 546 is to balance out the otherwise unbalanced forces occurring when the linkage mechanism is in one or another of its off-center positions. It can be seen that an upward movement of slide 540 on track bar 542 causes a displacement of the five-bar linkage described, such that gripper bars 454 will be urged away from each other. This motion is confined to a horizontal plane and straight line motion relative to the sides of a cell R by virtue of the roller and track arrangements 530, 532 and 533. Similarly a downward motion of slide 540 on track bar 542 causes gripper bars 454 to move toward each other. When the gripper arms 454 are urged away from each other, they come to rest symmetrically at opposite sides of a cell R. When gripper arms 454 are urged towards each other, the degree of freedom of movement allows each pair of gripper bars 454 to assume any position between the sides of its cell R depending upon the on or off-spot position of a pin gripped by the opposed bars 454. Each standing on and off-spot pin to be gripped, lifted and respotted, as described hereinafter, is clamped by the under surface of table trap doors 452 against alley A. Thus, when a normal on-spot clamped pin is to be gripped by bars 454 for lifting and respotting, each bar 454 moves substantially the same distance from its inoperative position adjacent the side of a cell R into gripping engagement with a side of the neck of a pin. Gripping bars are so located that when table T is positioned at position 404, bars 454 can engage and grip the necks of any standing pins to be lifted.

If a pin to be lifted and respotted occupies an off-spot position, as soon as the bar 454 nearest the pin engages it, the movement of the bar is arrested. The other gripper bar 454 of the pair, however, continues its forward movement into gripping engagement with the opposite side of the neck of the pin, whereupon its motion is arrested and the pin is firmly gripped for lifting. The same operation takes place simultaneously with each of the ten pairs of gripper bars 454. It will be seen, therefore, that because of its operating connections, each bar 454 is given an on-spot, off-spot range which allows each pair of bars to grip a pin anywhere within the general area of a cell R. The provision of elongated gripper bars or rollers 454 makes possible the positive gripping of on- and off-spot pins over substantially the entire area occupied by bowling pins on the pin supporting deck of an alley, which is a greater area than heretofore available for this purpose. Parallelism of gripper bars 454 is maintained by the inherent torsional rigidity of pendant links 534 coupled with the resistance to bending and torsional stiffness of the rest of the five-bar linkage, and its associated parts and attachments, which make possible the individual and differential travel of each bar 454 of a pair of gripper bars 454 towards an on or off-spot pin.

*Table Moving Mechanism*

The vertical movement of table T is effected by the rotation of crank arms 330 and the action of connecting rods 346, which in turn imparts vertical reciprocating motion to the table T through connecting crank arms 344. In the travel of the table from full up position 402 to full down position 406, and return, crank arms 344 at these positions remain substantially vertical, see FIGURE 1. When, however, table T is stopped at respotting position 404, crank arms 330 will be substantially in the position shown in dotted lines in FIGURE 7, and connecting rods 346 will be angularly displaced in approximately the manner shown in that figure.

Arms 344 are freely journalled upon shaft 340 but are restrained from moving in a clockwise direction by adjustable stops 550 mounted in suitable ribs 551 on brackets 342 and acting in conjunction with their respective stop pins 554 integrally attached to and projecting from arm 344, see FIGURE 7. Further clockwise motion of crank arm 330, through the action of connecting rod 346, will cause arm 344 to rotate in a counter-clockwise direction to a predetermined angle with respect to the table during the time the table is held at respot height or position 404.

A crank arm 556 is fixed to each end of shaft 340 and each carries an adjustable set screw 558. Each stop pin 554 is extended through an arm 344 to form at the opposite side thereof a drive pin 560. When crank arms 344 move in a counter-clockwise direction, each arm 344 rotates freely on shaft 340 until drive pins 560 thereon abut adjustable set screws 558. Further counter-clockwise motion of crank arms 344 will now impart counter-clockwise rotary motion to shaft 340 through the desired angle, as previously mentioned. Shaft 340, see FIGURES 1 and 2, comprises the rear shaft of a set of four shafts, the other three being designated 562, 564, and 566, respectively. These shafts are so arranged that when shaft 340 is rotated, shafts 562, 564 and 566 also rotate in the same direction and to an equal extent. The operation of these shafts is used to actuate the gripper mechanisms simultaneously in all of the cells R. For example, shaft 340 when rotated, effects the simultaneous operation of the pairs of opposed gripper arms 454 in the four transversely arranged cells R at the rear of the table, see FIGURE 2; shaft 562 effects like operation of the grippers 454 in the three cells forward of the four just mentioned; shaft 564 operates the grippers 454 in the next two forward cells and shaft 566 effects a similar actuation of gripper 454 in the one cell at the front.

The four shafts preferably are interconnected for simultaneous rotation by means generally of the same sort as shown and described for the purpose of operating the door mechanism. For example, shaft 340 is provided with a crank 568 to which is pivoted one end of link 570 operatively connected at its other end to a similar crank 572 secured to shaft 562. This shaft has another crank 574 operatively connected by a link 576 to crank 578 on shaft 564. Shaft 564, in turn, has a crank 580 operatively connected to a crank 582 on shaft 566 by a link 584.

*Gripper Operating Mechanism*

Since the operation of the gripper mechanism in each cell R is identical, the description will be limited to the operation of the gripper bars 454 in cell R corresponding to No. 1 pin position, see FIGURES 5, 10 and 11.

A crank arm 590 is freely journalled on shaft 566 near its center. A collar 592 is secured to shaft 566 adjacent crank arm 590. A pin 593, FIGURE 10, fixed to collar 592 engages slot 594 in crank arm 590. A torque spring 596 surrounding shaft 566 has one end attached to crank arm 590 and its opposite end to an adjustable sleeve 598 encircling shafts 566. Also attached to sleeve 598 is one end of locking spring 600 which frictionally engages shaft 566 to positively position and lock spring 596 with respect to shaft 566. The spring force exerted by spring 596 is such as to urge the outer end of crank arm 590 in a downward direction with respect to shaft 566, but such movement is normally prevented by pin 593 engaging the end of slot 594 as indicated in FIGURE 5. The outer end of crank arm 590 is pivotally attached at 601 to one end of a connecting link 602. The other end of connecting link 602 is attached by a cross-pin to pivot 539 between slide 540 and links 536. It can be seen that a counter-clockwise motion of crank arm 590 will, through connecting link 602, cause a downward movement of slide 540. Conversely, a clockwise motion of crank arm 590 will cause an upward movement of slide 540. This clockwise motion is necessary for the operation of the five-bar linkage which in turn actuates gripper arms 454 in the manner described.

As slide 540 is moved downwardly, gripper bars 454 engage and grip the neck; and their further inward movement is arrested. However, pin 593 attached to collar 592 on shaft 566, may, however, continue its counter-clockwise motion within the space provided by slot 594. This allows, in a cell where no pin is present, continued counter-clockwise motion of crank arm 590, pin 593, and the accompanying shaft as contrasted to an arrested or shorter stroke motion of crank arm 590, as just described.

A tab 604, FIGURES 3 and 5, carrying an adjustable set screw 606 is fixed to each crank arm 590. A switch bracket 608, FIGURE 5, supports a switch SW1 and actuator 609 in the path of travel of set screw 606. In the event that the gripper bars 454 come into engagement with a pin in their travel toward each other, they will be arrested short of contact with each other. In this case, the movement of tab 604 carrying set screw 606, and its supporting crank arm 590, is arrested prior to contact of screw 606 with the switch actuator 609. If, however, there is no standing pin to be gripped or engaged by a pair of gripper arms 454, the latter will continue to move towards and into engagement with each other, in which case the crank arm 590 will cause the set screw 606 to move a greater distance and it will then come into contact with and operate the switch actuator 609 for the corresponding switch SW1. A similar pin detecting device is provided for each pair of gripper arms 454. It can be seen that the absence or presence of pins in cells R is electrically detected for cyclic control of the machine.

As previously described, it is possible for a pin to be so far off its normal on-spot position that the head of the pin will be engaged by one of the lower flanges or some part of the lower section of the table frame structure. In such an event the table will be stopped at a safety position designated 408, see FIGURE 1.

The desired safety action may be effected by the engagement of a set screw 622 on arm 621 arranged alongside tab 604, FIGURE 3, which screw will engage a switch actuator 609 to close its associated switch SW13, FIGURE 5. Switch SW13 may be arranged in the power supply line to open the line and stop the machine.

Switch SW13 and switch SW1 are two switches operated by separate actuators (see FIG. 3). The switch SW1 actuator is adjusted such that it operates the switch when the grippers close beyond the point denoting a pin, when the table has descended to its full down position in the respot cycle. At this point, shaft 566 has not rotated sufficiently to actuate switch SW13. This position is as far as shaft 566 rotates when the table is at normal down height. If, however, a pin is beyond normal respot range, the table will stop at a higher position due to the pin supporting the table by members 436, 438, 440, 442, 444, and 446 of FIG. 4; and shaft 566 will rotate further than necessary for normal pin gripping action. Switch actuator set screw 622 on arm 621 is so adjusted that with this amount of rotation of shaft 566, a larger rotation than is required to actuate switch SW1, switch SW13 will be actuated. In a strike cycle, switch SW13 is not actuated. Since no pins are left standing, the table descends its full amount (no off-spot pins hold it up) and shaft 566 does not rotate sufficiently to actuate switch SW13. Switch SW1 is actuated, however, if switch SW13 is actuated, but switch SW13 is not necessarily actuated if switch SW1 is actuated inasmuch as a greater rotation of shaft 566 is required to actuate switch SW13 than is required to actuate switch SW1.

The switch SW13 actuator set screw supporting arm 621 is attached to collar 592 which rotates with the shaft, whereas the switch SW1 actuator is attached to crank 590 which is rotated by the force of spring 596 whenever the shaft 566 rotates. Hence, the rotations of crank 590 and shaft are not necessarily the same. Shaft 566 can rotate a larger number of degrees than can crank 590 which stops rotation when the gripper arms come to rest either together or gripping a pin.

This higher than normal stopping position for the table causes crank arm 344 to be rotated in a counter-clockwise direction further than needed for operation of the pin gripping mechanism. The differential action just described between crank arm 590 and shaft 566 allows a sufficient degree of freedom to accommodate this excessive angular motion of crank arm 344 and associated torque shafts 340, 562, 564 and 566 without mechanical damage to the spotting table and its associated mechanism.

From the preceding description, it may be seen that the electrical indication will be that no pins have remained standing and the cycle and scoring of the machine will be modified accordingly. This modification seldom takes place because of the infrequency of such an extreme off-spot pin. It is considered in the design to prevent damage to the machine.

The tendency of the gripper arms 454 to close through the mechanism described is opposed by the force of a pair of springs 612, FIGURES 1 and 4. Thus when the holding or driving force of connecting rod 346 is relaxed from crank arm 344, springs 612 will return bars 454 of the gripper mechanism to their full open or inoperative position. This, of course, releases any pins which are to be respotted on the alley. Springs 612 each have one end connected to crank arms 579 extending from shaft 564. The opposite ends of springs 612 are attached to spring clips 614 on the lower flange of transverse frame member 440.

Brackets 581 are secured to opposite sides of table frame 430. Adjustably mounted in brackets 583 are stop screws 581 adapted to be engaged by levers 579 on shaft 564. In this manner the opening movement of gripper bars 454 is restricted. This arrangement also prevents gripper bars 454 from striking against the end frames of their respective cells R if for any reason, table T should be released accidentally and drop suddenly to its lowermost position.

Attached to crank arm 568, see FIGURE 7, is a cam plate 615 which rotates with shaft 340. A latch 616 pivoted at 617 on bracket 342 has one end arranged to engage a tooth on cam 615 through the action of a spring 618. This spring extends about armature 619 of solenoid 620 to which one end of latch lever 616 is pivoted. In the latched position, shaft 340 will have been rotated to the proper position for the gripper mechanism to have fully closed. When it is desired to lift pins from the alley, this cam and latch lock the gripper mechanism in its closed position. When the pins are again lowered to the alley, solenoid 620 is energized, thus releasing latch 616 from engagement with cam 615 and allowing springs 612 to return the several gripper arms 454 to their full open position. Similarly when it is desired, in the cycle of the machine, to electrically indicate the presence or absence of pins in the various cells R, solenoid 620 is energized while this standing pin detection is carried out, again allowing the gripper mechanism to return to its open position through the action of springs 612.

The invention above described may be varied in construction within the scope of the claims, for the particular device, selected to illustrate our invention, is but one of the many possible concrete embodiments of the same. It is not, therefore, to be restricted to the precise details of the structure shown and described.

What is claimed is:

1. A spotting unit for a bowling pin spotting machine comprising a bowling pin guiding and positioning member, said member having an upper outwardly flared portion and a lower substantially cylindrical portion, means mounting said member with its longitudinal axis substantially vertical, a pair of opposed pin supporting and clamping trap doors, a pin positioning and guiding device on the upper surface of each of said trap doors for positioning pins on said trap doors and guiding movement of the pins as they are being discharged upon movement of said trap doors, a hinge supporting each of said trap doors beneath said lower portion of said member, means normally maintaining said trap doors positioned in a plane substantially at right angles with the longitudinal axis of said member for supporting the base of an upright bowling pin located within said lower portion of said member and between said positioning and guiding devices, said bowling pin guiding and positioning member being adapted to receive a bowling pin and guide such pin over said flared portion into said cylindriacl portion an dsaid pin positioning and guiding devices and onto said trap doors, and mechanism for moving said trap doors downwardly relative to a pin supported thereon, said mechanism including operating means for interrupting the movement of and locating said trap doors in downwardly inclined partially open position with a pin supported by said trap doors between said positioning and guiding devices, and means for subsequently moving said trap doors and devices clear of said pin whereby said pin moves downwardly to complete the discharge of said pin from said unit.

2. In a bowling pin spotting machine, a device for placing bowling pins on the playing bed of an alley, said device having a plurality of pin spotting units arranged in substantially pin playing formation, a driving shaft, an operating lever attached to said shaft, a shaft carried by said device, an arm loose on said shaft, a link connecting said arm and said lever, interconnected operating mechanism for said pinspotters including an actuating shaft, a lever fixed to said actuating shaft, a link fixed to said lever, a second link pivotally mounted on said device, a common pivot pin connecting the free ends of said links, a cam follower carried by said pivot pin, a cam tracked by said follower, means for driving said first-named shaft after each ball of a frame is thrown to lower and raise said device relative to said alley, and means selectively actuated by the presence or absence of a standing pin on said alley for causing said follower to travel along predetermined portions only of said cam for selectively operating said units.

3. In a pin spotter device, a frame, a plurality of pin spotting units mounted on said frame in an arrangement conforming with the playing arrangement of bowling pins on the playing bed of an alley, movable pin supporting and guiding plates forming a part of each of said units, actuating shafts for said plates, including a primary actuating shaft, interconnected operating elements connecting said shafts for substantially simultaneous operation of all of said plates, a lever fixed to said primary shaft, an operating linkage connected to said lever, including a cam follower, a pin spotter unit plate operating cam, said cam comprising a pivoted substantially vertical elongated section having an intermediate angular portion, and a second elongated substantially vertical section having an angular portion at its top end spaced therefrom and substantially parallel thereto, means for raising and lowering said frame, and selective mechanism operative in accordance with the travel of said cam follower on selected sections of said cam as the result of the movement of said frame for controlling the operation of said primary shaft.

4. In a bowling pin spotting machine, the combination of: a table mounted for vertical movement relative to a bowling alley between a plurality of positions including a spotting position, said table defining a plurality of triangularly arranged, vertically extended cells; means for moving said table; a plurality of pin guiding and positioning members mounted on said table above said cells, each of said members being adapted to receive a bowling pin and position such pin so that its axis is in alignment with one of said cells; a plurality of sets of support plates pivotally mounted on said table, each set comprising a pair of plates mounted beneath a different one of said members and above the cell associated therewith, said pair of plates being movable between a closed position and a plurality of open positions, said plates when in said closed position supporting a pin in said member and movement of said plates from said closed position through said open positions being operative to lower the pin supported thereby through the cell associated therewith; means for moving said plates between positions; and a pin positioning and guide device mounted on the upper surface of each of said plates; each of said devices having a curved portion for guiding a pin so that its axis remains vertical as it is being lowered through said cell associated therewith toward a spotted position on the alley.

5. In a bowling pin spotting machine of the type having a frame supporting on its lower portion a plurality of pin gripping units, the combination of: means mounting said frame for movement relative to a bowling alley between a plurality of positions including a spotting position; means for moving said frame; a plurality of substantially cylindrical members each mounted on the upper portion of said frame for receiving and positioning a bowling pin so that the axis of such pin is substantially vertical; a plurality of sets of support plates each pivotally mounted on the upper portion of said frame beneath a different one of said members for movement between a first position and a second position, each set being arranged to support a bowling pin within said member associated therewith when said plates are in said first position and to allow such pin to gravitate toward the alley upon movement of said plates from said first position toward said second position; a plurality of pin positioning and guide devices each mounted on the upper surface of a different one of said plates, each device having a first curved portion for positioning a pin and a second curved portion for guiding movement of a pin as it gravitates toward the alley so that the axis of such pin remains vertical; and means for moving said plates from said first position to said second position to spot pins on the alley when said frame is in said spotting position.

6. In a bowling pin spotting machine, the combination of: a stationary support; a table mounted on said support for movement between a plurality of positions including a spotting position; means for moving said table; a plurality of spotting units carried by said table for spotting pins on said alley when said table is in said spotting position, each of said spotting units comprising a funnel adapted to receive a pin, a pair of trap doors pivotally mounted beneath said funnel and a pair of pin positioning and guide devices each mounted on a different one of said doors, said doors being movable between a closed position and a plurality of open positions, said doors being operative to support a bowling pin within said funnel when in said closed position and to discharge such pin from said funnel upon movement from said closed position through said open positions, said pin positioning and guide devices each including an arcuate portion for positioning a pin on said trap doors and a curved portion which conforms generally with the taper of the butt-end of such pin for continuously guiding movement of and supporting such pin as it is being discharged so that the axis of such pin remains vertical; and means for moving said trap doors in response to movement of said table.

7. A bowling pin in accordance with claim 6 wherein said means for moving said trap doors comprises a cam mounted on said support and a cam follower carried by said table, said cam follower being operatively connected for actuating said trap doors, and said cam being arranged to actuate said cam follower, whereby pins are spotted on said alley as said table moves into said spotting position.

References Cited in the file of this patent

UNITED STATES PATENTS

| | | |
|---|---|---|
| 1,292,738 | Estabrook | Jan. 28, 1919 |
| 1,896,384 | White et al. | Feb. 7, 1933 |
| 2,380,601 | Luth et al. | July 31, 1945 |
| 2,550,919 | Frye | May 1, 1951 |
| 2,616,694 | Montooth | Nov. 4, 1952 |
| 2,621,961 | Whipple et al. | Dec. 16, 1952 |
| 2,697,605 | Montooth et al. | Dec. 21, 1954 |